(No Model.)

P. L. YOUNGREN.
BRICK KILN.

No. 492,251.

3 Sheets—Sheet 1.

Patented Feb. 21, 1893.

Witnesses,
G. H. Rouse
J. A. Bayless

Inventor,
Peter L. Youngren
By Dewey & Co.
atty (No Model.)　　　　　　　　P. L. YOUNGREN.　　　　3 Sheets—Sheet 2.
BRICK KILN.

No. 492,251.　　　　　　　　　　　　　Patented Feb. 21, 1893.

Witnesses:　　　　　　　　　　　　　Inventor,
　　　　　　　　　　　　　　　　　Peter L. Youngren
J. A. Bayless　　　　　　　　　　　By Dewey & Co.
　　　　　　　　　　　　　　　　　　　atty

THE NORRIS PETERS CO., PHOTO-LITHO., WASHINGTON, D. C.

(No Model.) 3 Sheets—Sheet 3.

P. L. YOUNGREN.
BRICK KILN.

No. 492,251. Patented Feb. 21, 1893.

Witnesses:

Inventor,
Peter L. Youngren
By Dewey & Co.
Attys

UNITED STATES PATENT OFFICE.

PETER L. YOUNGREN, OF OAKLAND, CALIFORNIA.

BRICK-KILN.

SPECIFICATION forming part of Letters Patent No. 492,251, dated February 21, 1893.

Application filed May 16, 1892. Serial No. 433,213. (No model.)

*To all whom it may concern:*

Be it known that I, PETER L. YOUNGREN, a citizen of Sweden, residing at Oakland, Alameda county, State of California, have invented an Improvement in Brick-Kilns; and I hereby declare the following to be a full, clear, and exact description of the same.

My invention relates to that class of kilns for burning bricks and other wares, in which suitable damper controlled passages and flues are provided to effect the course of the fire and draft in either direction, and its ready reversal.

My invention consists in the novel arrangement and combinations of passages and flues hereinafter fully described and specifically pointed out in the claims.

The objects of my invention are to provide for the reversal of the fire and draft in a simple and effective manner, and to admit hot air into the kiln chamber in such relation to the burning gases as to promote and complete combustion.

Figure 1:
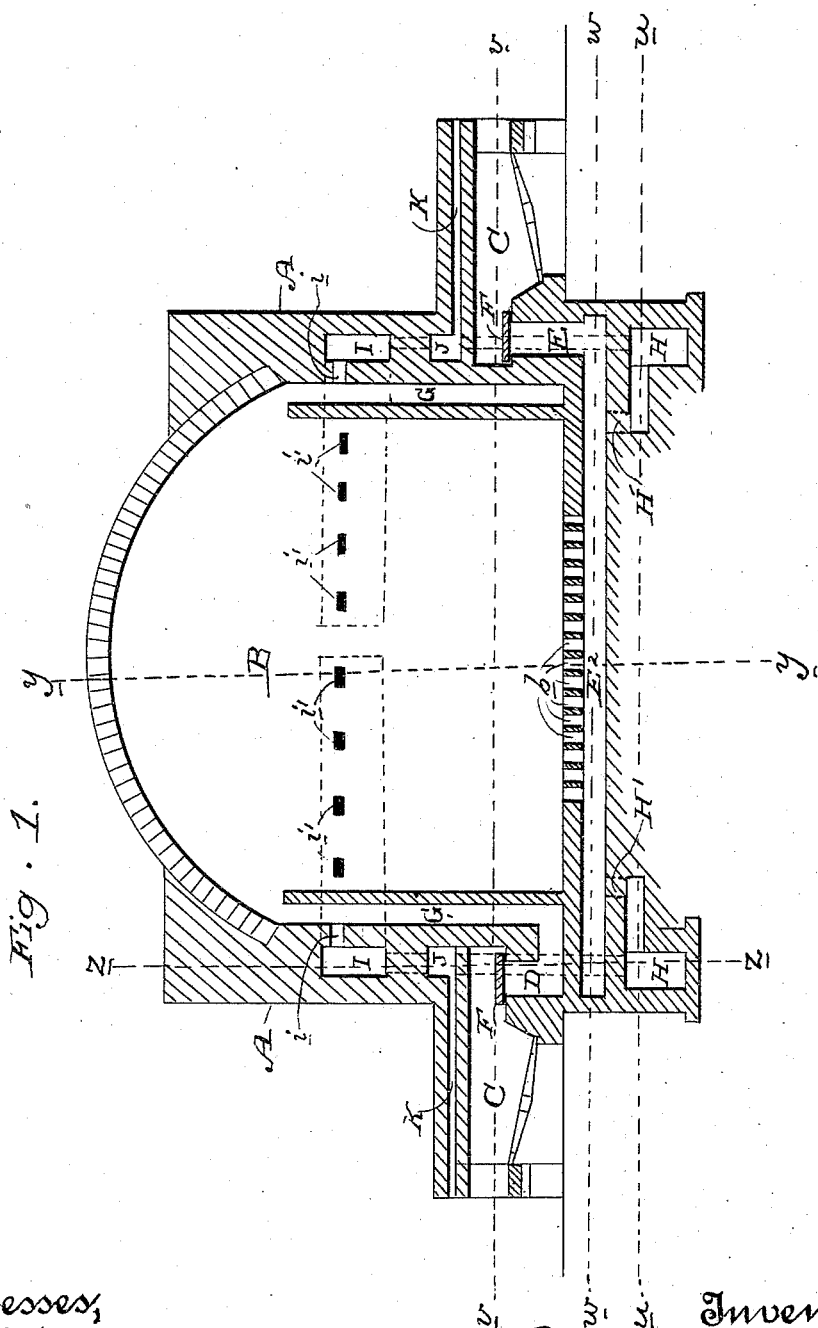
Figure 2:
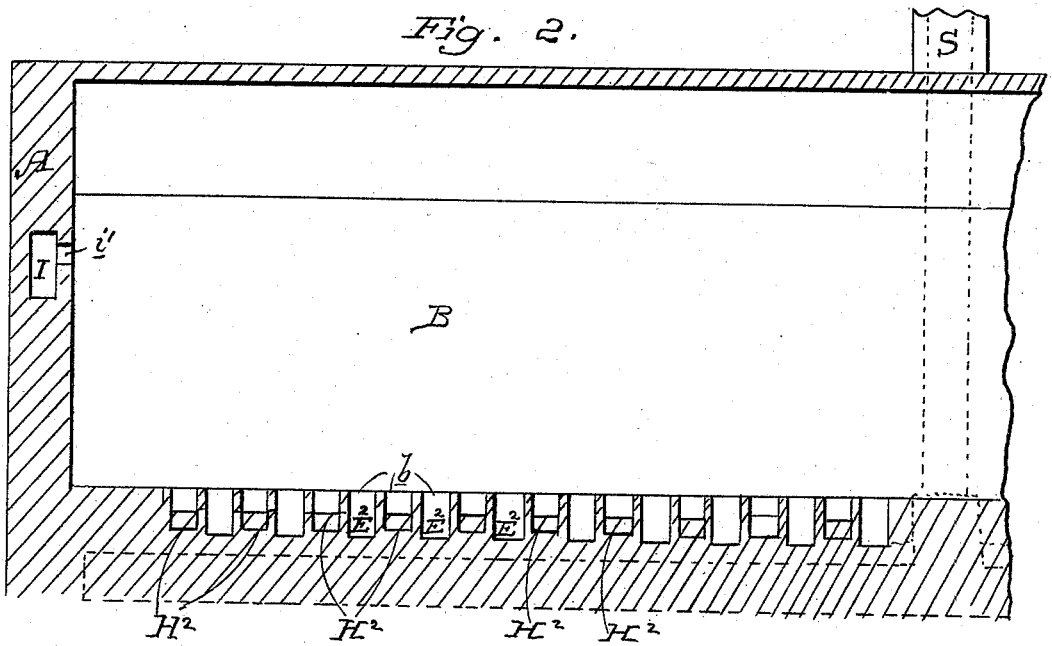
Figure 3:
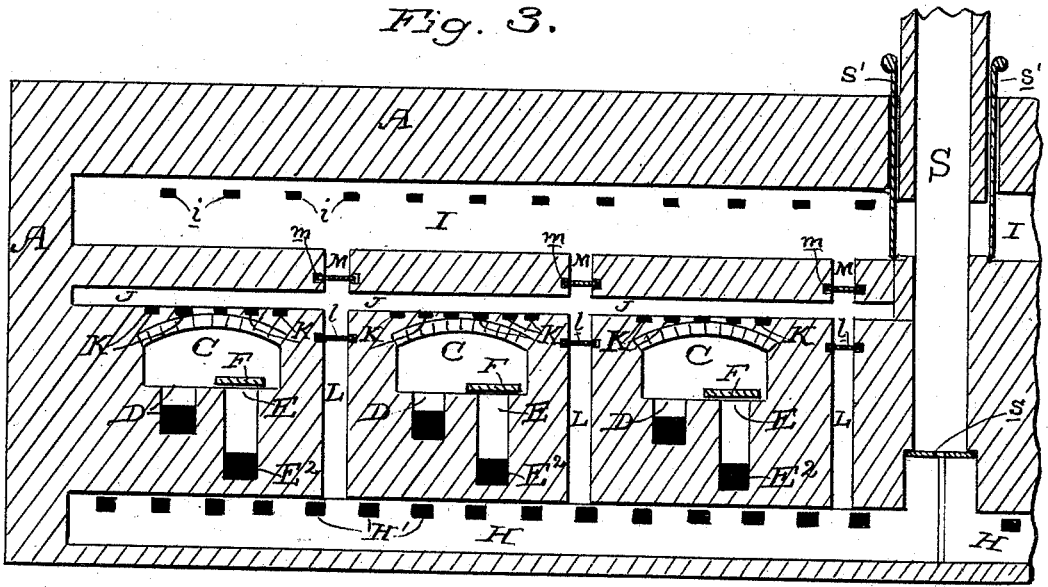
Figure 4:
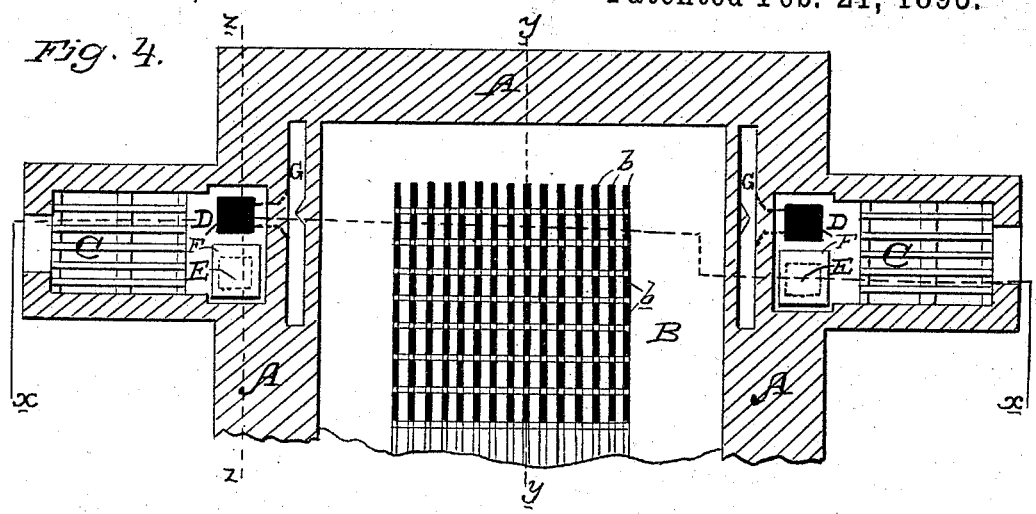
Figure 5:
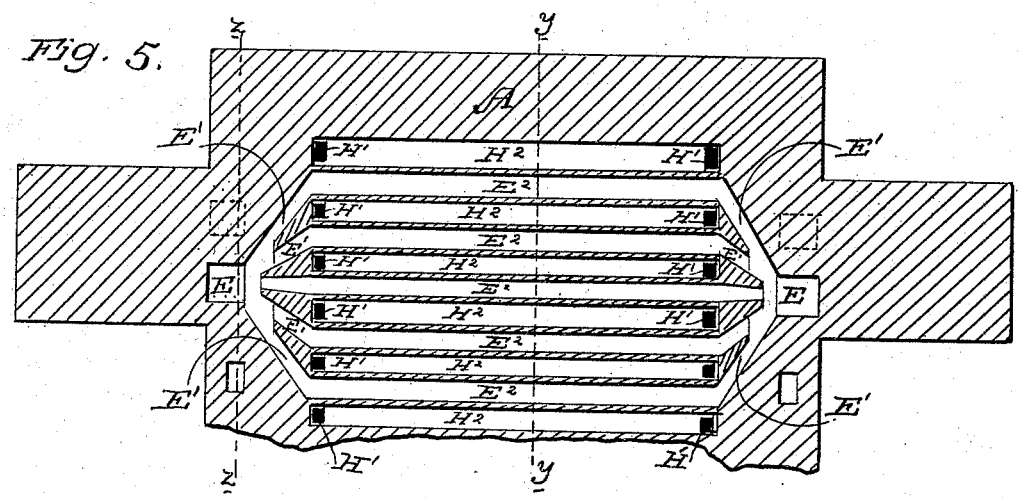
Figure 6:
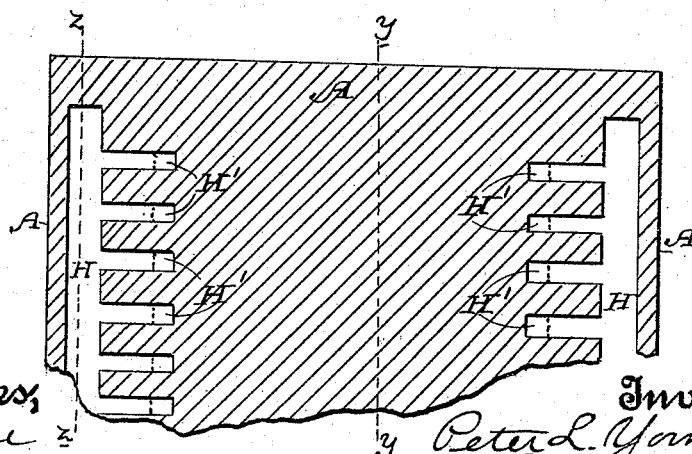

Referring to the accompanying drawings for a more complete explanation of my invention,—Figure 1 is a vertical cross section on the line $x$—$x$ of Fig. 4. Fig. 2 is a longitudinal vertical section on the line $y$—$y$ of Figs. 1, 4, 5 and 6. Fig. 3 is a longitudinal vertical section on the line $z$—$z$ of Figs. 1, 4, 5 and 6. Fig. 4 is a horizontal section on the line $v$—$v$ of Fig. 1. Fig. 5 is a horizontal section on the line $w$—$w$ of Fig. 1. Fig. 6 is a horizontal section on the line $u$—$u$ of Fig. 1.

A represents the walls of the kiln, inclosing the chamber B in which the bricks are to be burned.

C C are furnaces on each side of the kiln. In the throat of each furnace are made a flue D and a flue E side by side. These are alternately controlled by a sliding fireproof slab or damper F which lies upon their entrances, and is sufficient to cover but one of them at a time. It is operated by a poker by which it can be pushed from one side to the other to open either flue and close the other.

The flue D extends downwardly and thence horizontally inwardly and communicates with the vertical pocket G on the inner walls of the kiln, said pocket opening into the chamber near its upper portion. The flue E extends downwardly to a plane lower than that to which flue D extends. It then joins short horizontal diverging flues E' which extend inwardly and each of these flues E' joins a separate horizontal flue $E^2$, all of which extend parallel under and across the entire width of the floor of the kiln chamber. In this floor are made the openings $b$ whereby flues $E^2$ communicate with chamber B.

In each side of the lower portion of the kiln is made a horizontal draft passage H, which extends throughout the length of the kiln walls. These passages, at one end communicate with the stacks S, said communication being controlled by a damper $s$. Each passage H has opening out from it at intervals short passages H', which open upwardly into horizontal passages $H^2$ which extend transversely across the entire width of the floor of the kiln chamber, in the same plane and alternating with the flues $E^2$ heretofore described. These passages $H^2$ communicate with the kiln chamber through the openings $b$ in its floor.

In the side walls of the kiln, near their upper portions, are formed the horizontal draft passages I, which extend throughout the length of the kiln and communicate at one end with the stacks S, said communication being controlled by damper $s'$. These passages open into the upper portion of pockets G through short passages $i$, and they also extend along the end walls of the kiln and open into the ends of the kiln chamber through short passages $i'$.

In the kiln, in each of its side walls and extending throughout their length, is a hot air passage J. These have communication with the outer air through passages K formed in the top walls of the furnaces C. They also communicate with draft passages H by a vertical passage L controlled by a damper $l$, and with the draft passages I by a vertical passage M controlled by a damper $m$.

The operation of my kiln is as follows:—The dampers F in all the furnaces are moved over to close the flues E and to open the flues D. The communication of draft passages I with the stack is closed, and their communication with the hot air passages J is opened. The communication of draft passages H with the stack is opened, and their communication with the hot air passages is closed. The burning gases now pass through flues D, and pockets G into the upper portion of the kiln chamber. They are here mixed with fresh hot air drawn in through air passages K, J and M, draft passages I and short passages $i$ and $i'$. They then pass down through the material to be burned and through openings $b$ in the chamber floor into the horizontal passages $H^2$ beneath the floor, and out through passages $H'$ and draft passages H to the stack. To reverse this course, the dampers F are moved over to open flues E and close flues D. The communication of draft flues I with the stack is opened, and their communication with the hot air passages J is closed. The communication of draft passages H with the stack is closed and their communication with the hot air passages J is opened. The burning gases now pass through flues E, divergent flues E' and horizontal flues $E^2$ up through openings $b$ into the lower portion of the kiln chamber. Upon entering the chamber they are mixed with fresh hot air entering through openings $b$ and drawn in through air passages K, J and L, draft passages H, H', and horizontal passages $H^2$ between the flues $E^2$. They then pass upwardly through the material, and find escape through short passages $i$ and $i'$ and draft passages I to the stack. In this operation it will be seen that a uniform burning of the material is effected by letting the heat pass from the top down through the material until its upper portion is nearly burned, and then reversing the course and letting the heat and yet imperfectly consumed gases, and the fresh hot air ascend through the material from the alternately located hot air and heat passages and flues $H^2$ and $E^2$, thus effecting the final combustion in the heart of the kiln chamber.

The alternating location of the flues $E^2$ and passages $H^2$ is of especial advantage in introducing together and thoroughly mingling the burning gases and fresh hot air to provide perfect combustion when and where most needed.

The draft passages H and I serve two purposes, namely, to introduce fresh hot air and to withdraw the products of combustion.

Having thus described my invention, what I claim as new, and desire to secure by Letters Patent, is—

1. In a brick kiln having openings in its chamber floor, the series of alternating heat flues $E^2$ and hot air passages $H^2$ extending under and communicating with said openings, substantially as herein described.

2. In a brick kiln having openings in its chamber floor and side furnaces, the heat flues E in the throat of said furnaces, the divergent flues E' with which flues E communicate and the series of horizontal parallel flues $E^2$ communicating with said flues E' and passing under the chamber floor and communicating with its openings, substantially as herein described.

3. In a brick kiln having openings in its chamber floor and side furnaces, the heat flues E in the throat of said furnaces, the divergent flues E' with which flues E communicate and the series of horizontal parallel flues $E^2$ communicating with said flues E' and passing under the chamber floor and communicating with its openings, in combination with the series of horizontal parallel hot air passages $H^2$ alternating with flues $E^2$ and communicating with the openings in the chamber floor, substantially as herein described.

4. In a brick kiln having openings in its chamber floor and side furnaces, the heat flues E in the throat of said furnaces, the divergent flues E' with which flues E communicate and the series of horizontal parallel flues $E^2$ communicating with said flues E' and passing under the chamber floor and communicating with its openings, in combination with the series of horizontal parallel hot air passages $H^2$ alternating with flues $E^2$ and communicating with the openings in the chamber floor, the passages H' communicating with said passages $H^2$, and the draft passages H communicating with the passages H' and having a damper controlled communication with the stack, substantially as herein described.

5. In a brick kiln having openings in its chamber floor and side furnaces, the heat flues E in the throat of said furnaces, the divergent flues E' with which flues E communicate, and the series of horizontal parallel flues $E^2$ communicating with said flues E' and passing under the chamber floor and communicating with its openings, in combination with the series of horizontal parallel hot air passages $H^2$ alternating with flues $E^2$ and communicating with the openings in the chamber floor, the passages H' communicating with said passages $H^2$, and the draft passages H communicating with the passages H', and having a damper controlled communication with the stack, the passages K in the furnace walls opening to the exterior air, the hot air passages J with which the passages K communicate, and the damper controlled passage L connecting passages J and H, substantially as herein described.

6. In a brick kiln having side furnaces and a chamber with inleading furnace flues and outleading draft passages, the hot air passages K in the furnace walls opening to the exterior air, the hot air passages J communicating therewith, and damper controlled passages connecting passages J with the draft passages of the kiln chamber, substantially as herein described.

7. In a brick kiln having a chamber with openings in its floor and side furnaces, the combination of the separate flues D and E in the furnace throats, and dampers to control them separately, the interior pockets G with which flues D communicate, said pockets entering the upper portion of the kiln chamber, the series of flues $E^2$ under the chamber floor and communicating with its openings, said flues communicating with the flues E of the furnaces, the series of passages $H^2$ alternating with flues $E^2$ and communicating with the openings in the chamber floor, the draft passages H communicating with the stack and with the series of passages H², and the draft passages I communicating with the stack and with the pockets G, substantially as herein described.

8. In a brick kiln having a chamber with openings in its floor and side furnaces, the combination of the separate flues D and E in the furnace throats, and dampers to control them separately, the interior pockets G with which flues D communicate, said pockets entering the upper portion of the kiln chamber, the series of flues E² under the chamber floor and communicating with its openings, said flues communicating with the flues E of the furnaces, the series of passages H² alternating with flues E² and communicating with the openings in the chamber floor, the draft passages H communicating with the stack and with the series of passages H², and the draft passages I communicating with the stack and with the pockets G, the hot air passages K in the furnace walls opening into the exterior air, the hot air passages J with which they communicate, and the damper controlled passages L and M separately connecting the passages J with the draft passages H and I respectively, substantially as herein described.

In witness whereof I have hereunto set my hand.

PETER L. YOUNGREN.

Witnesses:
S. H. NOURSE,
J. A. BAYLESS.